United States Patent [19]

Atchley

[11] Patent Number: 4,886,016

[45] Date of Patent: Dec. 12, 1989

[54] SPILL RESISTANT ANIMAL FEEDING DISH

[76] Inventor: Frank W. Atchley, 3006 Silverado Trail, Napa, Calif. 94558

[21] Appl. No.: 62,574

[22] Filed: Jun. 16, 1987

[51] Int. Cl.⁴ .............................................. A01K 5/01
[52] U.S. Cl. ....................................................... 119/61
[58] Field of Search ........................... 119/61; 206/564; 248/359.1, 615, 632

[56] References Cited

U.S. PATENT DOCUMENTS

| | | | |
|---|---|---|---|
| 1,577,281 | 3/1926 | Matzner | 248/359.1 |
| 2,177,170 | 10/1939 | Chapel | 248/615 |
| 3,664,304 | 5/1972 | Crter | 119/61 |
| 3,731,658 | 5/1973 | Livermore et al. | 119/61 |
| 3,995,595 | 12/1976 | Williams | 119/61 |
| 4,111,305 | 9/1978 | Thomas | 206/564 X |

Primary Examiner—Robert P. Swiatek
Attorney, Agent, or Firm—Harris Zimmerman; Howard Cohen

[57] ABSTRACT

A dish for holding substances that are to be consumed by an animal has a central portion forming a bowl and a peripheral region which slopes downwardly and outwardly from the rim of the bowl. An annular depression extends about the peripheral region to capture and retain food and the like which may escape the bowl portion due to the animal feeding. The bowl, peripheral region, and annular depression are formed integrally of molded plastic material. The plastic material may comprise a mixture of polyethylene, silicone, and parafin to form a hydrophobic, non-stick surface to facilitate cleaning. The dish is dimensioned with a low aspect ratio to resist tipping, tilting, and upset. An annular groove disposed about the circumference of the dish opens downwardly and retains segments of solid, resilient, high friction tubular material which are ground-engaging to resist lateral motion of the dish during feeding.

3 Claims, 1 Drawing Sheet

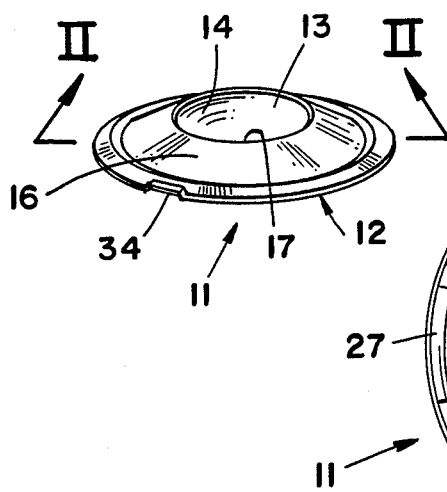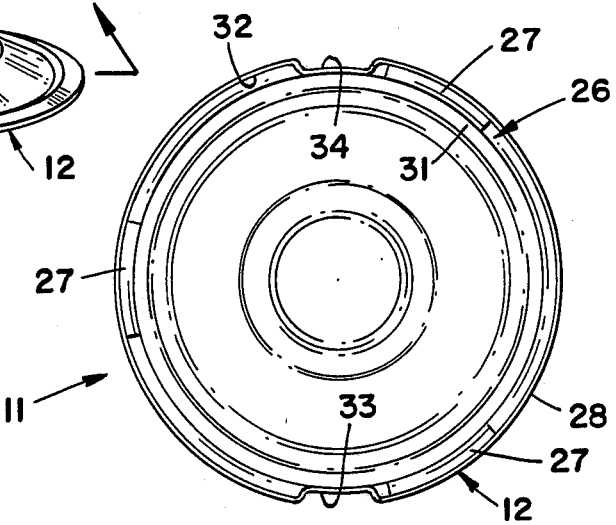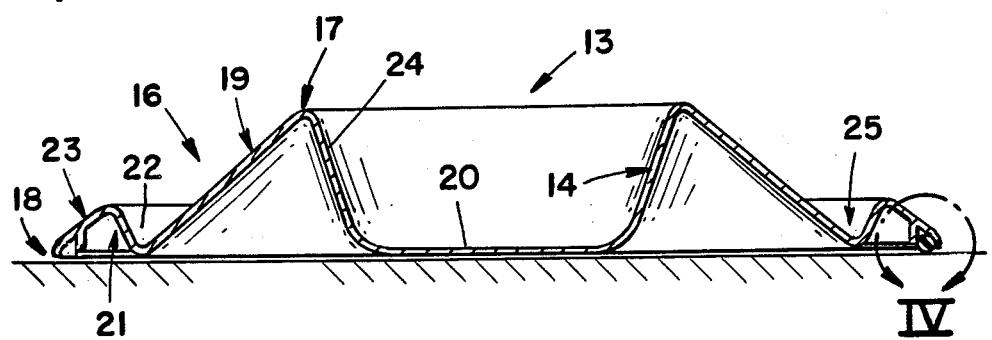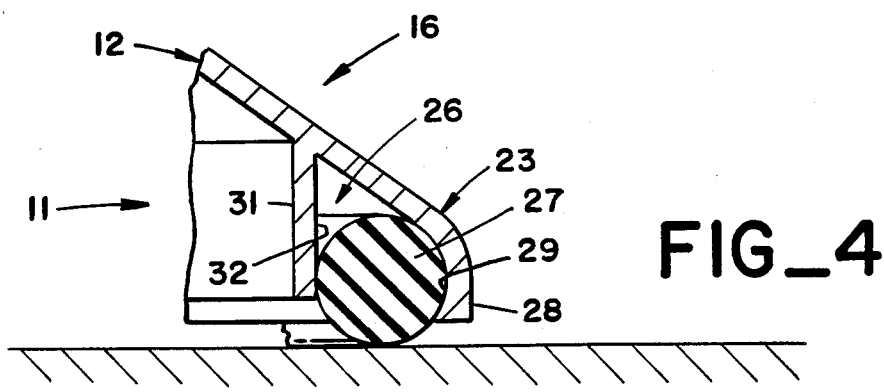

SPILL RESISTANT ANIMAL FEEDING DISH

BACKGROUND OF THE INVENTION

Pets such as dogs and cats are generally fed or watered by placing their food or water in a bowl disposed on the floor. A common complaint of pet owners is that the pet often spills food from the dish, or overturns the dish completely. Due to the fact that pet feeding bowls may remain accessible to the animal for many hours while the pet owner is absent, the spilled food is not cleaned away. As a result, the spilled food can comprise an attractant to insects, rodents, and other pets. Indeed, a frequent and serious disease affecting pets is leptospirosis, a disease that is spread solely by rodent contact with the pet food. Spillage from feeding bowls also causes staining of floors and carpets, odors, dangerous walking conditions, and the like.

As noted above, pet feeding bowls are often left out for hours, and the food may dry and cake onto the bowl surface. Many pet owners are aware of the difficulty in cleaning and removing dried food substances from the bowl.

Most pet feeding dishes may easily slide on a floor surface, and the feeding activity of the animal often causes the dish or bowl to move laterally a considerable distance. Thus the spillage and the like escapes the confinement of the owner-defined pet feeding area.

There are known in the prior art many designs of pet feeding bowls. Some are provided with wide bases to resist tipping and upset, and others have broad or flared upper edges to resist gripping by the animal's jaws. The concept of an antiskid dish to prevent lateral movement thereof appears not to be known in the prior art. Likewise, there appears to be no pet dish in the prior art that is designed with a non-stick surface to resist food caking and facilitate cleaning. The present invention is directed to overcoming these shortcomings in the prior art.

SUMMARY OF THE PRESENT INVENTION

The present invention generally comprises a pet feeding dish that is designed to resist lateral movement, tipping, and upset caused by the feeding activity of the animal. Furthermore, the dish is designed to prevent spillage of food or water due to the feeding activity, thus reducing the mess often associated with a pet feeding area.

The dish for holding substances that are to be consumed by an animal has a central portion forming a bowl and a peripheral region which slopes downwardly and outwardly from the rim of the bowl. An annular depression or moat extends about the peripheral region to capture and retain food and the like which may escape the bowl portion due to the animal feeding. The bowl, peripheral region, and annular depression are formed in concentric relationship and integrally fabricated of molded plastic material. The plastic material may comprise a compound of polyethylene, silicone, and parafin to form a hydrophobic, non-stick surface to facilitate cleaning. The dish is dimensioned with a low aspect ratio to resist tipping, tilting, and upset. An annular groove disposed about the circumference of the dish opens downwardly and retains segments of solid, resilient, high friction tubular material which are ground-engaging to resist lateral motion of the dish during feeding. In addition, low height cutout portions in the circumferential portion of the dish are provided to permit the dish to be easily lifted from a surface by manual effort.

More specifically, the dish of the present invention includes a central panel portion extending generally laterally, an first annular wall extending upwardly from the central panel portion, a second annular wall extending downwardly from a junction with the first wall portion, the junction of the two walls defining the rim of the feeding bowl. The second wall flares obliquely outwardly from the first wall at an angle sufficient to prevent biting and gripping of the bowl in an animal's jaws. A third annular wall portion extends upwardly from the the periphery of the second wall portion to define the annular moat or groove to retain food spilled from the bowl portion. Joined to the periphery of the third annular wall portion is a fourth annular wall portion extending obliquely downwardly therefrom to the floor or other supporting surface. The circumferential portion of the fourth wall portion contains the annular groove which retains the ground-engaging, antiskid supports. At least one cutout portion in the fourth wall portion is provided to facilitate manual grasping and lifting of the edge of the pet dish.

BRIEF DESCRIPTION OF THE DRAWING

FIG. 1 is a perspective view of the pet feeding dish of the present invention.

FIG. 2 is a cross-sectional elevation of the pet dish of the present invention.

FIG. 3 is a bottom view of the pet feeding dish shown in FIGS. 1 and 2.

FIG. 4 is an enlarged, detailed cross-sectional elevation of the peripheral edge assembly of the pet dish of the present invention, indicated by broken line IV in FIG. 2.

DESCRIPTION OF THE PREFERRED EMBODIMENT

The present invention generally comprises a pet feeding dish which is designed to eliminate spilling of pet food, resist tipping, sliding, and upset, to resist biting and grasping of the dish by the animal, and to ease cleaning of the dish after feeding. With reference to FIG. 1, the pet feeding dish includes a generally circular member 12 formed of a hard plastic material having a high gloss surface that resists penetration by an animal's teeth or claws. Member 12 has a bowl-shaped central region 13 forming an open topped chamber 14 in which an animal's food, water or the like may be contained.

The bowl portion 13 is defined by a first, medial bottom wall 20, and an annular bowl wall 24 extending obliquely upwardly from the edge of the bottom wall. A second annular wall 19 extends outwardly and obliquely downwardly from the upper edge portion of the bowl wall 24, the walls 19 and 24 defining the annular bowl rim. It should be noted that the included angle of the walls 19 and 24 is close to 90°, and this large angle, together with the hard, smooth surface of the dish-forming material, determines that an animal cannot bite and grasp the bowl to lift or overturn the dish.

The second annular wall 19 extends obliquely downwardly to a depth approximately equal to the height of the bowl wall, so that the lower edge of the wall 19 is generally adjacent to the supporting surface of the bowl. A third annular wall 22 extends upwardly from the peripheral edge of the wall 19, the rounded junction 21 of the walls 19 and 22 defining an annular groove or moat 25. It may be appreciated that the moat 25 completely surrounds the bowl portion 13 of the dish. Furthermore, the moat is linked to the bowl portion by the wall 19 sloping downwardly and outwardly thereto. Thus any food portions pushed out of the bowl 13 by the feeding action of the animal will roll or slide down the surface of the wall 19, and are caught and retained in the moat 25. Thus the mess of spilled food often associated with feeding a domestic pet such as a dog or cat is substantially reduced or eliminated.

The annular wall 22 extends upwardly only a fraction of the height of the rim 17, so that access to the bowl itself is not hindered. A fourth, outer annular wall 23 extends obliquely downwardly and outwardly from the upper edge of the wall 22 to a depth generally coextensive with the junction 21 and the bottom panel 20. The annular wall 23 includes an outer edge 28 that is rounded to extend directly downwardly to the floor or similar supporting surface. The wall 23 prevents the animal from extending a paw or muzzle under the edge of the dish to tilt or upset the dish, so that the risk of spilling and mess associated with animal feeding is further reduced. To facilitate manual lifting of the dish by human effort, at least one cutout portion 34 is formed in the outer annular wall 23, so that fingertips of the hand may be inserted under the dish to permit lifting and removal of the dish from any location. The cutouts 34 provide little opportunity for the animal to reach under the dish.

With regard to FIG. 4, a further feature of the present invention is directed toward maintaining the dish 11 in the location designated by the pet owner. An annular wall 31 extends downwardly from the bottom surface of the wall 23 toward the floor or like surface supporting the dish. The wall 31 is closely spaced to the curved edge 28 of the wall 23 to define therewith an annular groove or channel 26 extending about the dish. The inner surface 29 of the edge 28 is provided with a concave curvature confronting the surface 32 of the wall 31 to form a continuously extending channel cavity that has a channel opening narrower than the width of the channel itself. Secured within the channel are a plurality of segments of solid, resilient tubular material 27, the tubing having a diameter greater than the channel opening and being resiliently retained within the channel 26. The tubular material is formed of a material known to have a high coefficient of friction, such as rubber, foam rubber, plastic, foam plastic, or the like.

It may be appreciated that portions of the tubing segments 27 extend downwardly from the channel 26 to engage the floor or other surface in dish supporting fashion. The entire weight of the dish and contents applied to the tubular segments causes a high friction engagement with the floor, preventing sliding of the dish as the animal feeds from the bowl portion. The resilient tubular supporting arrangement also has a sound dampening effect, in that the rim of the dish itself does not contact the floor, and cannot rattle and drum against the floor as the animal feeds or nuzzles and plays with the bowl. It should also be noted that the curved edge 28 and the annular wall 31 adjacent thereto form a reinforced rim of the dish to strengthen the entire structure.

The moat 25 has a secondary purpose when there is potential attraction of vermin to the food within the bowl. For example, when the dish is used to feed a pet outdoors, ants and other insects, slugs, snails, and the like may crawl into pet food. In such circumstances, the moat 25 may be filled with a barrier substance that is not harmful to the pet, such as water, salt, or the like. Thus the pet food may be protected from crawling vermin.

A significant aspect of the present invention is that it is designed to be easily cleaned and reused. All of the annular apices at which the adjacent wall portions converge are rounded to prevent food and other materials from accumulating and sticking and drying. Furthermore, the dish is preferably molded in unitary fashion from a material that is heat resistant and strong to withstand cleaning in domestic dishwashers. In the preferred embodiment, the dish is formed of a solid polyethylene to which is added a compatible silicone compound in the range of 0-10% by weight, as well as a compatible paraffin material, also in the range of 0-10% by weight of the total composition. The silicone additive produces a hard, shiny surface that tends to resist adhesion of food, so that food particles cannot stick and dry thereon. In addition, the paraffin additive is interspersed in the polyethylene in a molecular, interstitial fashion, without forming a compound with the polyethylene itself. The paraffin has the tendency to exude slightly from the surface of the dish, creating a surface film that has both hydrophobic and non-stick properties. This film provides further resistance to food particle adhesion. Moreover, when the dish undergoes washing in warm or hot water, the paraffin film is removed, and further paraffin exudes from the interstitial spaces in the plastic matrix to create a new, clean film to once again resist particle sticking. The material can undergo thousands of cleaning cycles before the paraffin is exhausted.

It is significant to note that the support base for the dish of the present invention is disposed at the very periphery of the dish construction, to maximize the stability of the dish. The wall surfaces that an animal can impinge upon with muzzle, paws, or tail, including the annular walls 19 and 24, are spaced well inside the supporting rim, thus creating an inherently stable dynamic relationship. Also, the wall surfaces are all angled obliquely, so that any lateral upset force applied by the animal creates a vector component directed downwardly to increase the frictional engagement with the floor surface and resist lateral sliding motion.

It may also be appreciated that the pet feeding dish of the present invention is designed to be stackable with identical dishes, so that a large quantity of the dishes may be stored and displayed in a very small space.

I claim:

1. An animal feeding dish, including bowl means for retaining comestible substances to be consumed by an animal, a moat portion extending entirely about said bowl means to catch and retain spills from said bowl means, ground-engaging means disposed outwardly of said bowl means to form a supporting base substantially wider than said bowl means, said dish being formed of a continuous web of molded plastic material, said plastic material comprising a mixture of polyethylene, silicone, and paraffin, said silicone comprising up to 10% by weight of said plastic material and said paraffin comprising up to 10% by weight of said plastic material.

2. An animal feeding dish, including bowl means for retaining comestible substances to be consumed by an animal, a moat portion extending entirely about said bowl means to catch and retain spills from said bowl means, and ground-engaging means disposed outwardly of said bowl means to form a supporting base substantially wider than said bowl means, said bowl means including a generally circular central panel extending generally laterally, a first annular wall extending upwardly and flared outwardly from the peripheral edge of said central panel, a second annular wall extending downwardly and outwardly from the upper peripheral edge of said first annular wall, the conjunction of said first and second annular walls comprising a rounded apex that defines the upper rim of said bowl means, said second annular wall extending downwardly from said rim to a depth generally coextensive with said central panel, a third annular wall extending outwardly and upwardly from the peripheral edge of said second annular wall, the conjunction of said second and third annular walls comprising an inverted, annular, rounded apex that defines said moat means, said third annular wall extending upwardly to a height substantially less than the height of said rim, a fourth annular wall extending from the peripheral edge of said third annular wall, said fourth annular wall extending outwardly and downwardly from the conjunction with said third annular wall to a depth generally coextensive with said central panel and said moat means, means for both reinforcing the outer circumferential portion of said dish and for engaging the ground in non-skid fashion, including a fifth annular wall extending downwardly from the bottom surface of said fourth annular wall, said fifth annular wall being spaced closely to the peripheral edge of said fourth annular wall to define therewith a narrow annular channel, said narrow annular channel including a downwardly extending opening that is narrower than the width of said channel, a plurality of segments of solid tubular material, said segments formed of a resilient substance having a high coefficient of friction, said segments being dimensioned to have a diameter greater than the width of said channel opening and to be retained in said channel with a portion of said segments extending from said channel in ground-engaging fashion, said fourth annular wall extending downwardly to a circumferential edge that is closely spaced to the surface supporting said dish to resist lifting of said dish from beneath said circumferential edge by an animal, at least one handhold formed in said dish, said at least one handhold comprising a cutout portion in said fourth annular wall, said first and second annular walls define a solid angle sufficiently large to resist grasping in the jaws of an animal.

3. The animal feeding dish of claim 2, wherein said dish is formed of a plastic material comprising a mixture of polyethylene, silicone, and paraffin, said silicone comprising 0–10% by weight of said plastic material and said paraffin comprising 0–10% by weight of said plastic material.

* * * * *